July 19, 1960  J. D. WEIR  2,945,381
REFERENCE SYSTEMS FOR A DIRIGIBLE CRAFT
Filed Jan. 29, 1958
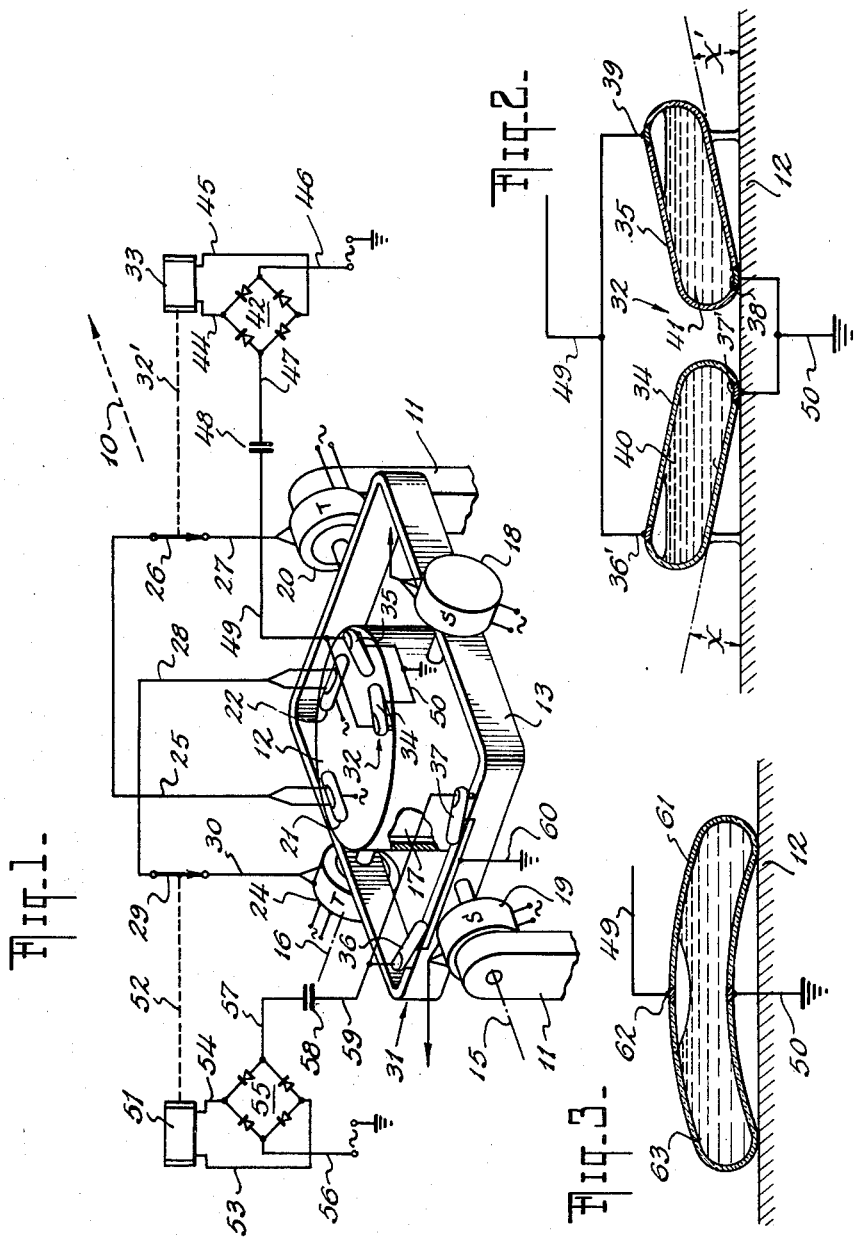
INVENTOR
JOHN D. WEIR
BY
Arthur H. Serrell
ATTORNEY United States Patent Office 2,945,381
Patented July 19, 1960

2,945,381

REFERENCE SYSTEMS FOR A DIRIGIBLE CRAFT

John D. Weir, Huntington, N.Y., assignor to Sperry Rand Corporation, a corporation of Delaware Filed Jan. 29, 1958, Ser. No. 711,998

9 Claims. (Cl. 74—5.4)

This invention relates generally to an improvement in reference systems for a dirigible craft. The improved system is more particularly of a character in which a long period reference instrument of the gyroscopic type, such as a gyro vertical, is slaved to a short period vertical defining device such as a gravity reference or pendulum. Such a system includes means for maintaining the rotor frame of the gyroscopic reference in a normally erected condition with the axis of the rotor thereof located in a substantially vertical position. The erecting or slaving means provided for the system includes the short period reference or device responsive to the effect of gravity for detecting or providing a measure of the tilt of the stable element or rotor frame of the gyroscopic instrument. The gyroscopic instrument of such a system is erected or slaved to an apparent vertical under the influence of acceleration on the gravity reference unless means are included therein for disabling or rendering the erecting or slaving controls ineffective. The requirement for such means in the system is caused by reason of the inability of the gravity reference to distinguish between actual tilt of the stable element or frame about on axis and the influence thereon of horizontal components of either lateral or fore and aft acceleration when the craft utilizing the system either changes its course in a banked or level turn or accelerates or decelerates in a forward direction.

Disablement of the erection or slaving controls in systems of this character have been accomplished through a switch-off control operated under the influence of a rate gyro that senses yawing motions of the craft. A further cut-out has been provided in the form of a switch whose operation depends on banking the craft through a predetermined angle. Turn sensing weight type accelerometers have also been used in this connection. The cut-off or operative point for these types of controllers depends on craft attitude about the fore and aft axis and/or the rate of movement of the craft about its yaw axis. Neither of these factors bears any direct relation to the extent of the error in the erection control for the system under the influence of the horizontal components of acceleration on the gravity references. In accordance with the present inventive concepts, the system is designed to permit operation of the normal slaving or erection controls over a desired range, the same being limited by the operation of the disabling means only when the influence of acceleration on the gravity reference reaches a predetermined value which depends on the craft on which the system is utilized.

A feature of the present invention is provided by the utilization of a liquid level switch of the on-off type as a component of the disabling means of the system.

Referring to the drawing showing the preferred form of the invention;

Fig. 1 is a diagrammatic view of a reference system depicting the present invention concepts;

Fig. 2 is an enlarged detail elevation of the tilted capsule type of switch utilized to trigger the disabling means of the improved system; and Fig. 3 is a view similar to Fig. 2, showing a modified form of switch utilizable in the system.

The reference system shown in Fig. 1 is a conventional long period gyroscopic system of the gyro vertical type that is utilized in a dirigible craft to provide signals in accordance with departures of the craft from a level attitude with respect to both its roll and pitch axes. The arrow 10 indicates the direction of travel of the craft forforwardly and orients the gyroscopic parts shown in the drawing in relation to the craft. As shown, the gyroscopic reference is fixed to the craft through mounting posts 11 on which a stable element or rotor frame 12 is universally supported by a gimbal ring 13. Element 12 is accordingly mounted with freedom about mutually perpendicular, normally horizontal, major and minor axes, the major axis 15 being provided by the axis of ring 13 on the posts 11, the same being substantially parallel to or coincident with the arrow 10 showing the direction of travel of the craft. The minor axis 16 of the element 12 is normally horizontal and perpendicular to axis 15 being provided by suitable bearings in the ring 13, that receive the extending trunnions of the rotor frame or case 12. The gyroscopic rotor of the instrument as indicated at 17 is rotatably supported in a conventional manner within the enclosing case and is driven by suitable means (not shown). In the gyroscopic reference described, a suitable pick-off or synchro 18 with a stator fixed to the ring 13 and a rotor positioned by the trunnion of stable element 12 provides an output when the craft departs from a level condition about its pitch axis. Likewise, the roll pick-off or synchro 19 operates to provide an output in accordance with departures of the craft from a level condition about its fore and aft axis. The stator of pick-off 19 is fixed to the post 11 and the rotor thereof is fixed to the trunnion extending from one end of the gimbal ring 13.

As shown in Fig. 1, conventional means are illustrated herein for slaving or erecting the stable element or rotor frame 12 of the gyroscopic reference instrument to a suitable short term vertical reference of the gravity responsive type such as a pendulum. The means specifically depicted herein for this purpose include an A.C. torque motor 20 at the axis 15 of the instrument that is controlled by the output of a conventional liquid level controller 21 in accordance with tilt of the element or case 12 about the minor axis 16. In a similar manner, the tilt detector liquid level controller 22 for the axis 15 provides an output for operating the A.C. torque motor 24 at the minor axis of the stable element 12. The capsules of the respective level devices 21 and 22 are fixedly mounted on the element 12. Each capsule is energized at an input electrode from a suitable source of alternating current electrical energy. Depending on the tilt of the case 12, either one or the other of the output electrodes of the respective controllers 21, 22 conducts the energy supplied thereto. The control field windings of the respective torque motors 20, 24, have a center-tapped connection fed by energy supplied from the source and respective connections to the output electrodes of the switches. The fixed field windings of the respective motors 20, 24 are continuously energized from the energy source. In operation, one of the controller electrodes controls a circuit through one phase of the control field windings of the respective motors while the other winding is ineffective. Accordingly, the motors operate to exert a torque in one direction when one of the electrodes conducts and in the opposite direction when the other electrode conducts. With tilt about axis 16, the proper electrode of level controller 21 conducts and energy is supplied to the proper control field winding of motor 20 to correct the tilt.

This circuit, as shown, includes leads 25, normally closed switch 26 and leads 27. The correction for tilt about axis 15 is similarly effected from controller 22 by way of leads 28, normally closed switch 29, and leads 30, to the torque motor 24. The normally closed circuits described operate to maintain the stable element, rotor frame or rotor case 12 in a properly erected or slaved condition with relation to gravity about its respective axes.

In accordance with the present inventive concepts, the improved system includes means for disabling or rendering the erection or slaving controls thereof ineffective. With the described type of erection controls herein provided, this is accomplished by opening the input circuit to the respective control field windings of the torque motors 20, 24 by actuation of the normally closed switches 26, 29, respectively to an open condition. The improved means provided to obtain this result is responsive to the same horizontal components of acceleration that influence the gravity references or controllers 21 and 22 included in the system when the craft either accelerates or decelerates in a forward direction or changes its direction in either a flat or banked turn. In turns, level controller 22 is effected by centrifugal acceleration and with forward speed change level controller 21 is effected by horizontal components of acceleration. Considered independently or collectively, the outputs of the gravity references as a result of the influence of the accelerations thereon are in error and where the error persists the stable element 12 becomes erected to an apparent vertical instead of an actual vertical. The means provided herein for preventing this occurrence differs from the constructional types of equipment heretofore provided for this purpose in the fact that the same is not dependent for operation on craft motions about its yaw axis or craft attitude about its roll axis. Neither of such erection cut-off types of controls are effective to disable the system when the forward acceleration or deceleration of the craft reaches or exceeds a predetermined value.

In accordance with the present invention, the erection or slaving disabling means senses horizontal components of acceleration and operates only when the influence of acceleration on the gravity reference reaches a predetermined value. Such means is provided by an accelerometer comprising a liquid level switch of the off-on type having capsule, electrode and fluid parts. One of such switches as indicated at 31 is provided to sense acceleration along the minor axis 16. Another switch 32 of the same character as shown in detail in Fig. 2 is provided to sense acceleration along the major axis 15. As shown, switch 31 is fixedly mounted on the ring 13 comprising part of the stable element of the gyro vertical. Switch 31 could be mounted in a similar fashion on case or stable element 12 of the gyro vertical. Switch 32 is stabilized in a horizontal plane by being suitably mounted on a fixed condition in the frame or case element 12 of the gyro vertical. In the form of the invention shown in Figs. 1 and 2, the switch 32 includes a pair of tilted capsules 34, 35, mounted on case 12 with opposite inclinations at fixed angles $x$ and $x_1$ to a normally horizontal plane as provided by the stable element. The capsules 34, 35 are aligned along the axis 15. The degree of angular inclination of the capsules 34 and 35 together with the relative positions of the electrodes and the amount of fluid determine the point of operation of the switch 32 where the horizontal component of acceleration at the cut-off point equals the tangent of the angle. For capsules of given electrode and fluid characteristics, the tilt angle depends on the type of aircraft on which the system is used. Capsules 36, 37 of switch 31 are aligned along the minor axis 16 of the system being fixedly mounted on the stable ring 13. These capsules are similarly inclined at a desired angle with respect to a normally horizontal plane. The electrode parts of the pair of capsules 34, 35 are respectively indicated at 36′, 37′, 38 and 39, Fig. 2. The fluid in the capsules conducts electrical energy. The parts are so arranged that the switch 32 is normally open, the break being between the respective electrodes 36′, 39 and the fluid 40, 41 in the respective capsules. Acceleration along axis 15 results in displacement of the bubble and closure of the switch as the fluid 40 contacts electrode 36′ when the sensed degree of acceleration attains such a value as to require disablement of the erection controls. Capsule 35 of the arrangement operates in a similar manner in accordance with deceleration values along the axis 15. The parts of the paired capsules 36, 37 also operate in a similar manner in accordance with acceleration values in respective directions as sensed along the axis 16 of the system.

The erection or slaving controls of the improved system are rendered ineffective in the structure shown in Fig. 1 by opening the input circuit between the respective gravity responsive devices 21, 22 and the electric torque motors 20 and 24 by actuating the switch blades or parts 26 and 29 which constitute means for opening the respective circuits. As shown in Fig. 1, pitch erection disablement is effected by actuating switch 26 to an open position by means of a relay 33 whose armature 32′ is connected thereto. The relay 33 is energized by the output of a rectifying bridge 42 being connected to opposite legs of the bridge by way of leads 44, 45. The input circuit to the other legs of the bridge 42 includes a suitable source of alternating current and the normally open switch 32 on rotor frame 12. As shown, lead 46 connects one input leg of the bridge to the source. The opposite leg is connected to ground by way of lead 47, condenser 48, lead 49 to the respective electrodes 36′, 39, by way of either fluid 40 or 41 whichever is effective to close the switch, electrodes 37′ or 38 and common lead 50. The input circuit to the bridge 42 is normally open so that until the required degree of acceleration is sensed by the switch 32 or the influence thereof on the gravity reference 21 reaches the predetermined cut-off value, the erection control remains effective. Electrical components of similar character are also provided for opening the switch 29 controlling the torque motor 24 by the output of gravity reference 22. The relay, in this instance, is indicated at 51. When relay 51 is energized, the armature 52 thereof actuates the switch 29 to an open position to break the input circuit to the torquer 24 controlling roll erection. Energy is supplied to operate the relay 51 by way of the output leads 53, 54 from the opposite legs of the rectifier bridge 55. Lead 56 connects one of the input legs to the bridge 55 to the energizing source. The other leg of the bridge is connected to ground through the normally open switch 31 and includes lead 57, condenser 58, lead 59 to the top electrodes of switch 31, corresponding to electrodes 36′, 39 on switch 32, the like bottom electrodes in the switch 31 corresponding to electrodes 37′, 38 in switch 32 and common lead 60. The pair of capsules 36, 37 are aligned on the ring 13 to sense acceleration along the minor axis 16. When the value of acceleration sensed by the switch 31 reaches a point as to close the input circuit to the bridge 55, the relay 51 operates to throw switch 29 to open the input circuit to the torquer 24 and thereby disable the roll erecting means of the system.

In the modification of the invention shown in Fig. 3, the acceleration sensing devices of the improved system are provided by respective fore and aft directed and laterally directed liquid levels of a single capsule type. In this structure, the switch is provided by an arched capsule 61 with an electrode 62 at its apex. The fluid in the switch is indicated at 63. In this instance for given electrode and fluid characteristics, the curvature of the capsule determines the operating point of the switch. The capsule 61 is represented in Fig. 3 as fixedly mounted on the rotor frame 12 in the same position as depicted for switch 32 in Fig. 1. A second switch of the same character may be mounted in the ring 13 to sense accelerations along the minor axis 16 of the system and control the disablement of the roll erection torque motor 24. The switches of the arched capsule type operate differentially depending on the direction of the acceleration influencing the fluid therein, the same closing the input circuit to the respective bridge related thereto only when the acceleration value reaches the point at which the disablement is required. With either type cutout switch, the erection controls normally effective to condition the rotor case 12 are restored to operation as soon as the acceleration value has dropped below the cutout point. In the improved system, the erection controls remain effective for a short period at the start of a turning maneuver of the craft and are restored to effectiveness prior to the end of the turning maneuver.

While I have described my invention in its preferred embodiments, it is to be understood that the words which I have used are words of description rather than of limitation and that changes within the purview of the appended claims may be made without departing from the true scope and spirit of my invention in its broader aspects.

What is claimed is:

1. In a system providing a vertical reference for dirigible craft, a universally supported stable element having respective mutually perpendicular, normally horizontal axes, a normally closed circuit operable to maintain the element in an erected condition about one of its axes including a device responsive to the effect of gravity providing an electrical output in accordance with tilt of the element about the one of its axes and a torque motor at the other of the axes of the element controlled by the output of the device, and means for opening said circuit including a normally open switch of the liquid level type with capsule, electrode and fluid parts, the capsule being fixed in relation to the element and the parts being arranged to sense components of acceleration along the other axis and close only at a predetermined acceleration value.

2. A system of the character claimed in claim 1, in which said switch includes a pair of tilted capsules mounted in relation to the element with opposite inclinations at a fixed angle to a normally horizontal plane, the degree of angular inclination of the capsules together with the relative positions of the electrodes and the amount of fluid determining the operative point of the switch.

3. A system of the character claimed in claim 1 in which said switch is provided by an arched capsule with an electrode at its apex situated in a vertical plane perpendicular to the one of the axes of the element, the curvature of the capsule together with the relative positions of the electrodes and the amount of fluid determining the operative point of the switch.

4. The combination of a gyro vertical having a rotor frame supported with freedom about respective mutually perpendicular, normally horizontal, major and minor axes, a normally closed circuit operable to maintain the frame in an erected condition about its major axis including a device responsive to the effect of gravity providing an electrical output in accordance with tilt of the frame about its major axis and a torque motor at the minor axis of the frame controlled by the output of the device, and means for opening said circuit including a normally open switch of the liquid level type with capsule, electrode and fluid parts, the capsule being fixed in relation to the frame and the parts being arranged to sense components of acceleration along the minor axis and close only at a predetermined acceleration value.

5. The combination claimed in claim 4, in which said switch includes a pair of tilted capsules mounted in relation to the frame with opposite inclinations at a fixed angle to a normally horizontally plane, the degree of angular inclination of the capsules together with the relative positions of the electrodes and the amount of fluid determining the closing point of the switch.

6. The combination claimed in claim 4, in which said switch is provided by an arched capsule with an electrode at its apex situated in a vertical plane perpendicular to the major axis of the frame, the curvature of the capsule together with the relative positions of the electrodes and the amount of fluid determining the closing point of the switch.

7. The combination of a gyro vertical having a rotor frame supported with freedom about respective mutually perpendicular, normally horizontal, major and minor axes, a normally closed circuit operable to maintain the frame in an erected condition about its minor axis including a device responsive to the effect of gravity providing an electrical output in accordance with tilt of the frame about its minor axis and a torque motor at the major axis of the frame controlled by the output of the device, and means for opening said circuit including a normally open switch of the liquid level type with capsule, electrode and fluid parts, the capsule being fixed in relation to the frame and the parts being arranged to sense components of acceleration along the major axis and close only at a predetermined acceleration value.

8. The combination claimed in claim 7, in which said switch includes a pair of tilted capsules mounted on the frame with opposite inclinations at a fixed angle to a normally horizontal plane, the degree of angular inclination of the capsules together with the relative positions of the electrodes and amount of fluid determining the closing point of the switch.

9. The combination claimed in claim 7, in which said switch is provided by an arched capsule with an electrode at its apex situated in a vertical plane perpendicular to the minor axis of the frame, the curvature of the capsule together with the relative positions of the electrodes and amount of fluid determining the closing point of the switch.

References Cited in the file of this patent

UNITED STATES PATENTS

| | | |
|---|---|---|
| 2,087,961 | Anscott | July 27, 1937 |
| 2,409,188 | Braddon et al. | Oct. 15, 1946 |
| 2,803,965 | Machover | Aug. 27, 1957 |